US011104431B2

(12) United States Patent
Schmaling et al.

(10) Patent No.: US 11,104,431 B2
(45) Date of Patent: Aug. 31, 2021

(54) ROTOR BLADE SNUBBER RETAINER FOR A ROTARY WING AIRCRAFT

(71) Applicant: Sikorsky Aircraft Corporation, Stratford, CT (US)

(72) Inventors: David N. Schmaling, Southbury, CT (US); Richard C. Lay, Harwinton, CT (US); Leon M. Meyer, Harwinton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 347 days.

(21) Appl. No.: 15/771,549

(22) PCT Filed: Oct. 27, 2016

(86) PCT No.: PCT/US2016/058989
§ 371 (c)(1),
(2) Date: Apr. 27, 2018

(87) PCT Pub. No.: WO2017/079014
PCT Pub. Date: May 11, 2017

(65) Prior Publication Data
US 2018/0312249 A1 Nov. 1, 2018

Related U.S. Application Data

(60) Provisional application No. 62/249,639, filed on Nov. 2, 2015.

(51) Int. Cl.
*B64C 27/48* (2006.01)
*B64C 27/33* (2006.01)
*B64C 27/35* (2006.01)

(52) U.S. Cl.
CPC .............. *B64C 27/48* (2013.01); *B64C 27/33* (2013.01); *B64C 27/35* (2013.01)

(58) Field of Classification Search
CPC ......... B64C 27/33; B64C 27/35; B64C 27/39; B64C 27/48
See application file for complete search history.

(56) References Cited

U.S. PATENT DOCUMENTS 4,087,203 A 5/1978 Ferris
4,244,677 A * 1/1981 Noehren ................. B64C 27/33
416/134 A (Continued)

OTHER PUBLICATIONS

International Search Report for International Application No. PCT/US2016/58989; dated Feb. 24, 2017; 8 pages.

(Continued)

*Primary Examiner* — Brian P Wolcott
(74) *Attorney, Agent, or Firm* — Foley & Lardner LLP (57) ABSTRACT

A flexbeam rotor blade assembly includes a flexbeam having a body that includes a first surface, a second, opposing surface, and an opening extending through the first and second surfaces. At least one snubber is mounted to one of the first and second surfaces spaced along the body from the opening. A snubber retainer is mounted to one of the first and second surfaces between the body and the at least one snubber. The snubber retainer includes a retainer plate having a snubber attachment member to which the snubber assembly is mounted and a mounting arm including a retainer plate opening spaced from the snubber attachment member. The retainer plate opening registers with the opening in the flexbeam. A mechanical fastener extends through the retainer plate opening and the opening in the flexbeam. The mechanical fastener joins the snubber retainer to the one of the first and second surfaces.

14 Claims, 5 Drawing Sheets

(56) References Cited

U.S. PATENT DOCUMENTS

| | | | |
|---|---|---|---|
| 4,676,720 A | | 6/1987 | Niwa et al. |
| 5,092,738 A | | 3/1992 | Byrnes et al. |
| 5,431,538 A | | 7/1995 | Schmaling et al. |
| 5,460,487 A | | 10/1995 | Schmaling et al. |
| 5,499,903 A | * | 3/1996 | Schmaling .............. B64C 27/35 |
| | | | 416/134 A |
| 5,690,474 A | | 11/1997 | Byrnes et al. |
| 5,738,494 A | | 4/1998 | Schmaling |
| 9,884,680 B2 | * | 2/2018 | Meyer .................... B64C 27/33 |
| 10,272,996 B2 | * | 4/2019 | Kinlan ................... B64C 27/82 |
| 2011/0243731 A1 | | 10/2011 | Meyer et al. |

OTHER PUBLICATIONS

Written Opinion of the International Search Report for International Application No. PCT/US2016/58989; dated Feb. 24, 2017; 7 pages.
Extended European Search Report for European Application No. 16862731.3; Date of Completion: Mar. 22, 2019; dated Apr. 1, 2019; 10 Pages.

\* cited by examiner

ROTOR BLADE SNUBBER RETAINER FOR A ROTARY WING AIRCRAFT

CROSS REFERENCE TO RELATED APPLICATIONS

This application is a National Stage application of PCT/US2016/058989, filed Oct. 27, 2016, which claims the benefit of U.S. Provisional Application No. 62/249,639, filed Nov. 2, 2015, both of which are incorporated by reference in their entirety herein.

BACKGROUND

Exemplary embodiments pertain to the art of rotary wing aircraft and, more particularly, to a rotor blade snubber retainer for a rotary wing aircraft.

Rotary wing aircraft utilize one or more rotor assemblies to provide vertical lift off and translational capabilities. The rotor assemblies rely upon multiple rotor blades that are rotated about a rotor axis. In some instances, the rotor blades may take the form of flexbeam rotor blades which utilize pivot or elastomeric bearings between a flexbeam and a surrounding torque tube. The elastomeric bearings position the torque tube relative to the flexbeam to permit pitch, flap, and lag.

The elastomeric bearings are typically referred to as a snubber/damper which may include vertically stacked arrangements of spherical and flat elastomeric laminates. The snubber/damper is typically mounted through an opening in the torque tube for attachment to a retainer plate that is adhesively bonded to the flexbeam. Conventional elastomeric bearings may fail as a result of retainer plate debond. After a retainer plate debond, the elastomeric bearings may be pulled outboard by a combination of centrifugal forces and bearing preload.

BRIEF DESCRIPTION

Disclosed is a flexbeam rotor blade assembly including a flexbeam having a body that includes a first surface, a second, opposing surface, and an opening extending through the first and second surfaces. At least one snubber assembly is mounted to one of the first and second surfaces spaced along the body from the opening. A snubber retainer is mounted to one of the first and second surfaces between the body and the at least one snubber. The snubber retainer includes a retainer plate having a snubber attachment member to which the at least one snubber assembly is mounted and a mounting arm including a retainer plate opening spaced from the snubber attachment member. The retainer plate opening registers with the opening in the flexbeam. A mechanical fastener extends through the retainer plate opening and the opening in the flexbeam. The mechanical fastener joins the snubber retainer to the one of the first and second surfaces.

In addition to one or more of the features described above or below, or as an alternative, further embodiments could include wherein the retainer plate includes a first thickness at the snubber attachment member and a second thickness at the mounting arm, the second thickness being greater than the first thickness.

In addition to one or more of the features described above or below, or as an alternative, further embodiments could include wherein the second thickness defines a step region including a first end, a second end and an intermediate portion, the retainer plate opening being arranged at the intermediate portion.

In addition to one or more of the features described above or below, or as an alternative, further embodiments could include wherein the second thickness defines a taper extending from the first end to the second end.

In addition to one or more of the features described above or below, or as an alternative, further embodiments could include wherein the taper corresponds to a tapered profile of the one of the first and second surfaces of the flexbeam.

In addition to one or more of the features described above or below, or as an alternative, further embodiments could include wherein the second end defines, at least in part, an outer edge of the snubber retainer.

In addition to one or more of the features described above or below, or as an alternative, further embodiments could include an elastomeric pad arranged between the snubber retainer and the one of the first and second surfaces.

In addition to one or more of the features described above or below, or as an alternative, further embodiments could include wherein the elastomeric pad extends from the snubber attachment member up to the step region.

In addition to one or more of the features described above or below, or as an alternative, further embodiments could include wherein the mounting arm directly contacts the one of the first and second surfaces.

In addition to one or more of the features described above or below, or as an alternative, further embodiments could include a rotary wing aircraft including an airframe having an extending tail. A main rotor assembly is mounted to the airframe and is configured to rotate about a main rotor axis. A tail rotor system is mounted at the extending tail. The tail rotor system is configured to rotate about a tail rotor axis. At least one of the main rotor assembly and the tail rotor system includes the flexbeam rotor blade assembly.

Also disclosed is a snubber retainer mountable to a surface of a flexbeam and a snubber connecting the flexbeam and a torque tube of a blade assembly. The snubber retainer includes a retainer plate having a snubber attachment member and a mounting arm including a retainer plate opening spaced from the snubber attachment member. The retainer plate opening registers with an opening in the flexbeam. The retainer plate includes a first thickness at the snubber attachment member and a second thickness at the mounting arm, the second thickness being greater than the first thickness. An elastomeric pad is arranged between the snubber retainer at the first thickness and connectable to the surface of the flexbeam.

In addition to one or more of the features described above or below, or as an alternative, further embodiments could include wherein the retainer plate includes a first thickness at the snubber attachment member and a second thickness at the mounting arm, the second thickness being greater than the first thickness.

In addition to one or more of the features described above or below, or as an alternative, further embodiments could include wherein the second thickness defines a step region including a first end, a second end and an intermediate portion, the retainer plate opening being arranged at the intermediate portion.

In addition to one or more of the features described above or below, or as an alternative, further embodiments could include wherein the second thickness defines a taper extending from the first end to the second end.

In addition to one or more of the features described above or below, or as an alternative, further embodiments could include wherein a width of the retainer plate at the mounting arm is less than a width of the retainer plate at the snubber attachment member.

In addition to one or more of the features described above or below, or as an alternative, further embodiments could include wherein the elastomeric pad extends from the snubber attachment member up to the step region such that the mounting arm directly contacts the one of the first and second surfaces.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
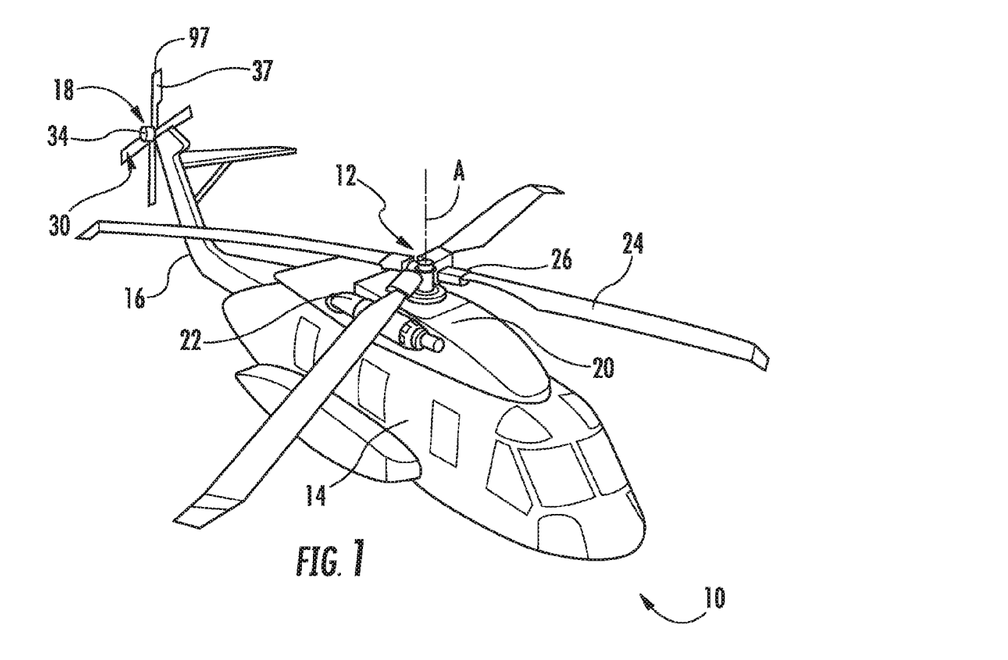
FIG. 1 is a general perspective view of a rotary wing aircraft including a snubber retainer, in accordance with an exemplary embodiment.

A rotary wing aircraft, in accordance with an exemplary embodiment, is indicated generally at 10, in FIG. 1. Aircraft 10 includes a main rotor assembly 12 supported by an airframe 14 having an extending tail 16. An anti-torque or tail rotor system 18 is supported at extending tail 16. Main rotor system 12 is driven through a main rotor gearbox (MGB) 20 about an axis A by a multi-engine power plant system 22. Multi-engine power plant system 22 powers MGB 20 to drive main rotor system 12 and tail rotor system 18. Main rotor system 12 includes a plurality of main rotor blade assemblies 24 supported by a main rotor hub 26. Tail rotor system 18 includes a plurality of tail rotor blade assemblies 30 supported by a tail rotor hub 34.

Figure 2:
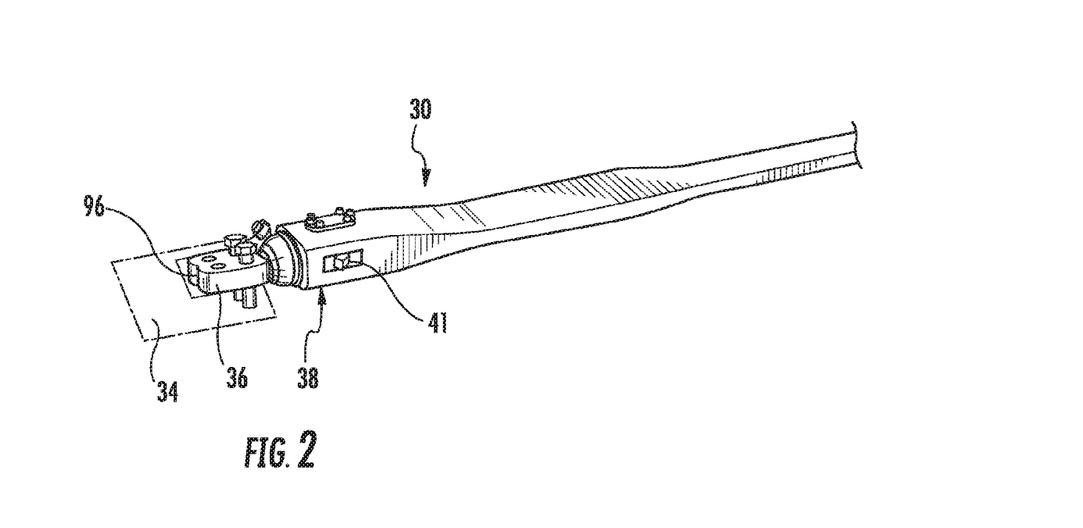
FIG. 2 is an expanded perspective view of a tail rotor blade assembly.

As shown in FIG. 2, each tail rotor blade assembly 30 includes a flexbeam 36 which mounts to tail rotor hub 34 and disposed internal to a tail rotor blade 37 (FIG. 1). Flex beam 36 reacts aerodynamic loads of tail rotor blade 37. A torque tube 38 envelops, at least in part, flexbeam 36. Torque tube 38 mounts to, or may be integrally formed with, a tail rotor blade 37 to accommodate blade flap and/or pitch change motion into tail rotor blade assembly 30 through deflection of flexbeam 36. Pitch change to each tail rotor blade assembly 30 may be input through a pitch horn 41 mounted to each torque tube 38. Manipulation of each pitch horn 41 causes each tail rotor blade assembly 30 to pitch about a feathering axis. At this point, it should be understood that while described in terms of a single tail rotor blade assembly 30, it should be understood that exemplary embodiments may also be incorporated into dual tail rotor systems as well as both single and dual (co-axial) main rotor systems.

Figure 3:
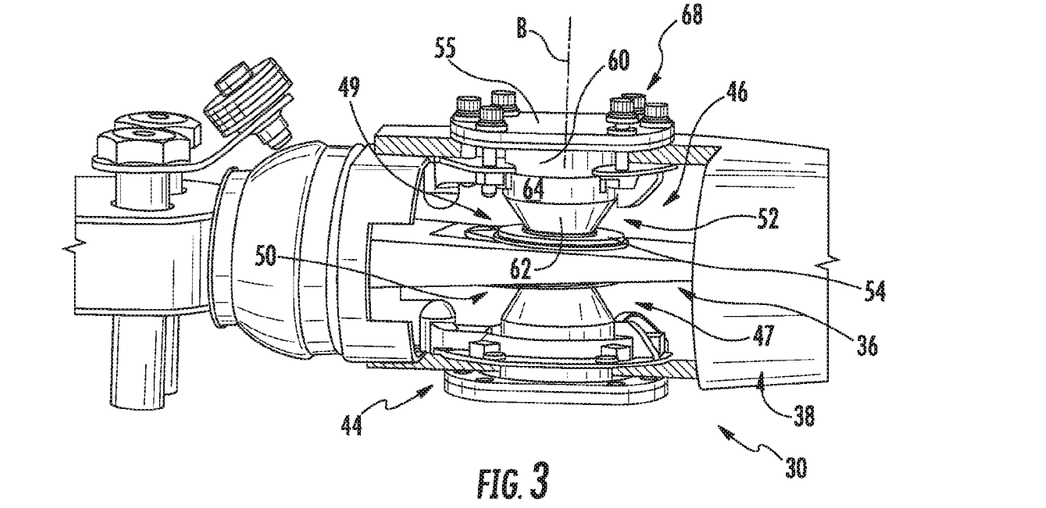
FIG. 3 is an expanded partial cross-sectional view of the tail rotor blade assembly of FIG. 2.
Figure 4:
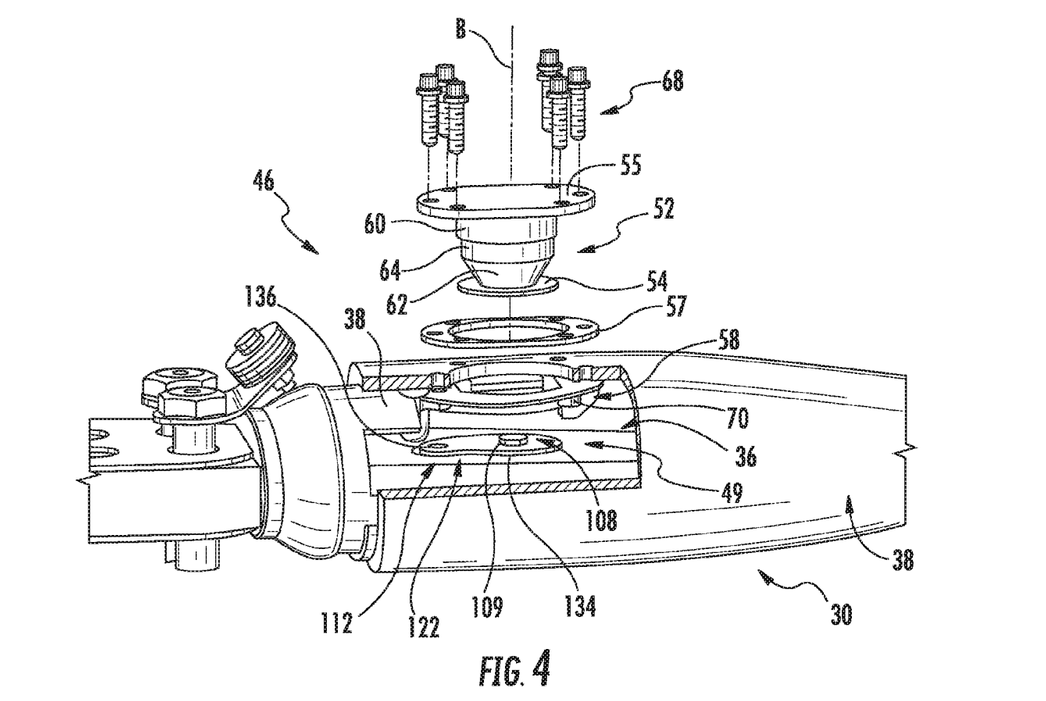
FIG. 4 is a partial exploded view of the tail rotor assembly of FIG. 3.

As shown in FIG. 3, each tail rotor blade assembly 30 includes a snubber or elastomeric bearing system 44 having an upper snubber or bearing assembly 46 and a lower snubber or bearing assembly 47. Upper bearing assembly 46 is operatively connected to flexbeam 36 through an upper snubber retainer 49 and lower bearing assembly 47 is mounted to flexbeam 36 through a lower snubber retainer 50. Reference will now follow to FIG. 4 in describing upper bearing assembly 46 with an understanding that lower bearing assembly 47 may include similar structure. Upper bearing assembly 46 includes an upper elastomeric bearing 52 having an inner race 54 and an outer race 55, a spacer 57, and a backing plate 58. Elastomeric bearing 52 may include an outer damper portion 60 and an inner snubber portion 62. A rigid transition layer 64 extends between outer damper portion 60 and inner snubber portion 62. Elastomeric bearing 52 is secured to torque tube 38 through mechanical fasteners 68 and a mechanical fastener 70.

Figure 5:
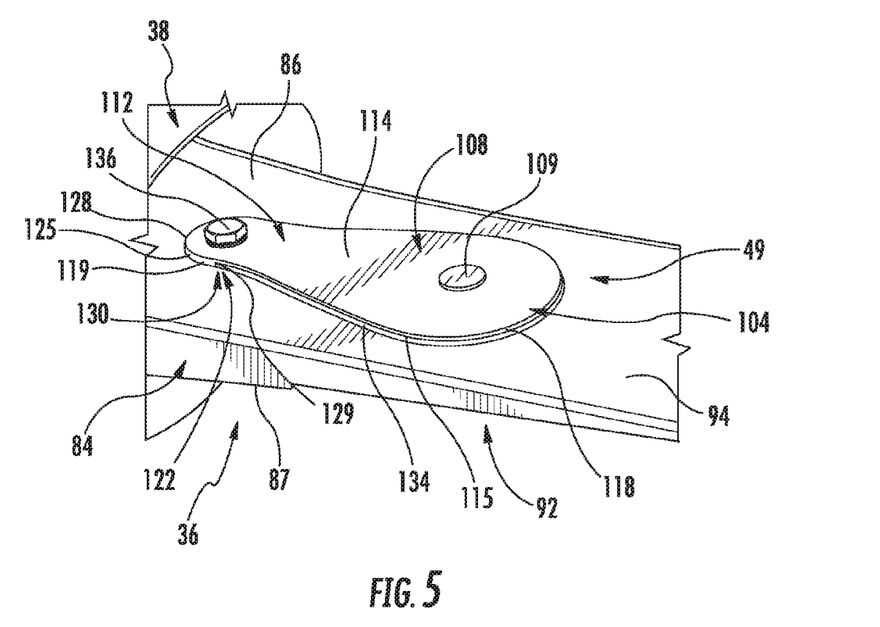
FIG. 5 is a partial perspective view of a snubber retainer, in accordance with an exemplary embodiment.
Figure 6:
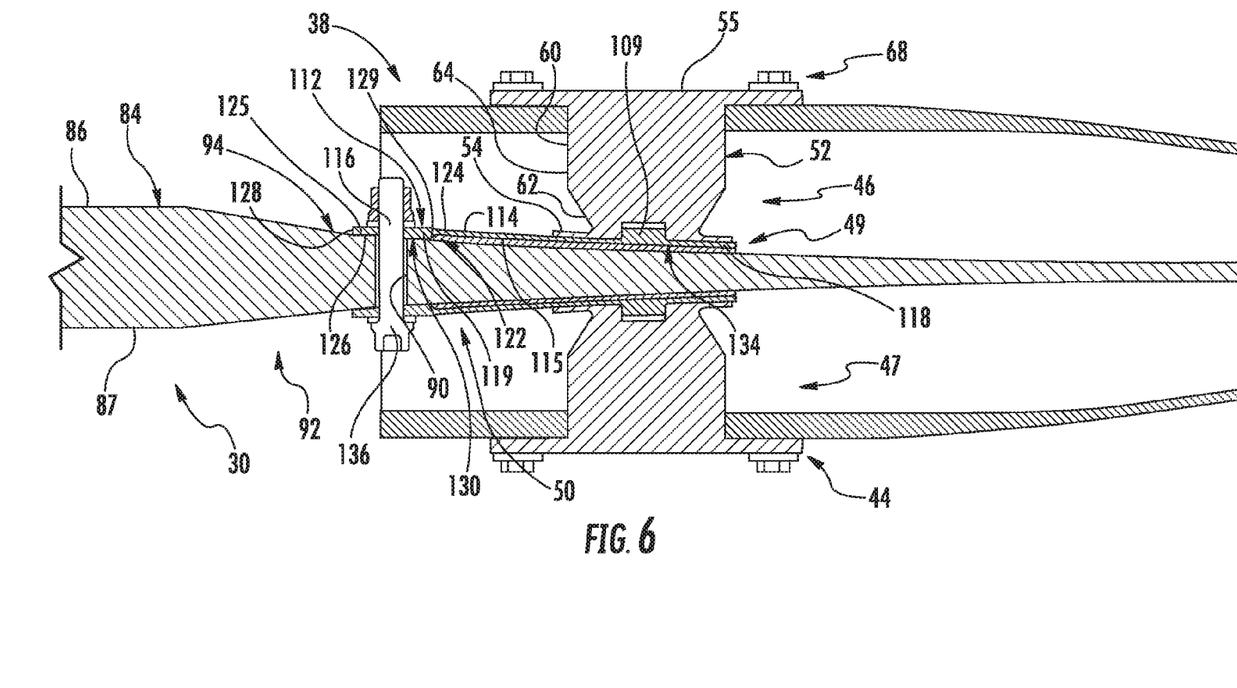
FIG. 6 is a partial cross-sectional view of a rotor blade and torque tube of the tail rotor assembly of FIG. 4.

Reference will now follow to FIGS. 5 and 6 in describing upper snubber retainer 49 with an understanding that lower snubber retainer 50 may include similar structure. In accordance with an aspect of an exemplary embodiment, each flexbeam 36 includes a body 84 having a first surface 86 and an opposing second surface 87. An opening 90 extends through body 84 between first and second surfaces 86 and 87. Body 84 includes a tapered region 92 having a tapered profile 94 that extends from a root portion 96 (FIG. 2) to a tip portion 97 (FIG. 1).

In accordance with an aspect of an exemplary embodiment, upper snubber retainer 49 includes a retainer plate 104 having a snubber attachment portion 108 provided with a snubber attachment member 109 and a mounting arm portion 112. Mounting arm portion 112 extends radially outwardly of snubber attachment portion 108. Retainer plate 104 includes a first surface portion 114 and a second, opposing surface portion 115. A retainer plate opening 116 extends through first and second surface portions 114 and 115 at mounting arm portion 112.

Mounting arm portion 112 includes a first thickness 118 and a second thickness 119 that is greater than first thickness 118. Second thickness 119 is provided at retainer plate opening 116 and defines a step region 122 that extends from a first end 124 toward and a second end 125 through an intermediate portion 126. Second end 125 defines an outer edge 128 of retainer plate 104 while first end 124 defines, at least in part, a step 129. Mounting arm portion 112 includes a taper 130 that extends from first end 124 to second end 125. Taper 130 generally corresponds to tapered profile 94 of flexbeam 36. Upper snubber retainer 49 is also shown to include an elastomeric pad 134 that may extend from step 129 toward snubber attachment portion 108. In this manner, mounting arm portion 112 may be in direct contact with flexbeam 36 at retainer plate opening 116. In the exemplary embodiment shown, elastomeric pad 134 provides an interface between first surface 86 and retainer plate 104.

Elastomeric pad 134 provides strain isolation between retainer plate 104 and flexbeam 36. More specifically, elastomeric pad 134 insulates retainer plate 104 from the high strains in flexbeam 36, which has many benefits. For example, reducing strain leads to a reduction in a risk of mechanical failure of retainer plate 104. Further reducing strain leads to a reduction in a risk of adhesive failure between retainer plate 104 and flexbeam 36 and also reduces the stiffness contribution of retainer plate 104 on flexbeam 36. A mechanical fastener 136 extends through retainer plate opening 116 and another retainer plate opening (not separately labeled) on a lower retainer plate (also not separately labeled) to join upper and lower snubber retainer assemblies 49 and 50 to flexbeam 36. Mechanical fastener 136 provides a redundant load path to adhesive that may be applied between elastomeric pad 134 and flexbeam 36. Further, taper 130 enables mounting arm portion 112 to be substantially parallel to flexbeam 36. Further, taper 130 allows mounting arm portion 112 to directly abut first surface 86 of flexbeam 36. In this manner, mechanical fastener 136 may apply a preload between retainer plate 104 and another retainer plate (not separately labeled) associated with lower snubber retainer 50 without the presence of an elastomer.

Figure 7:
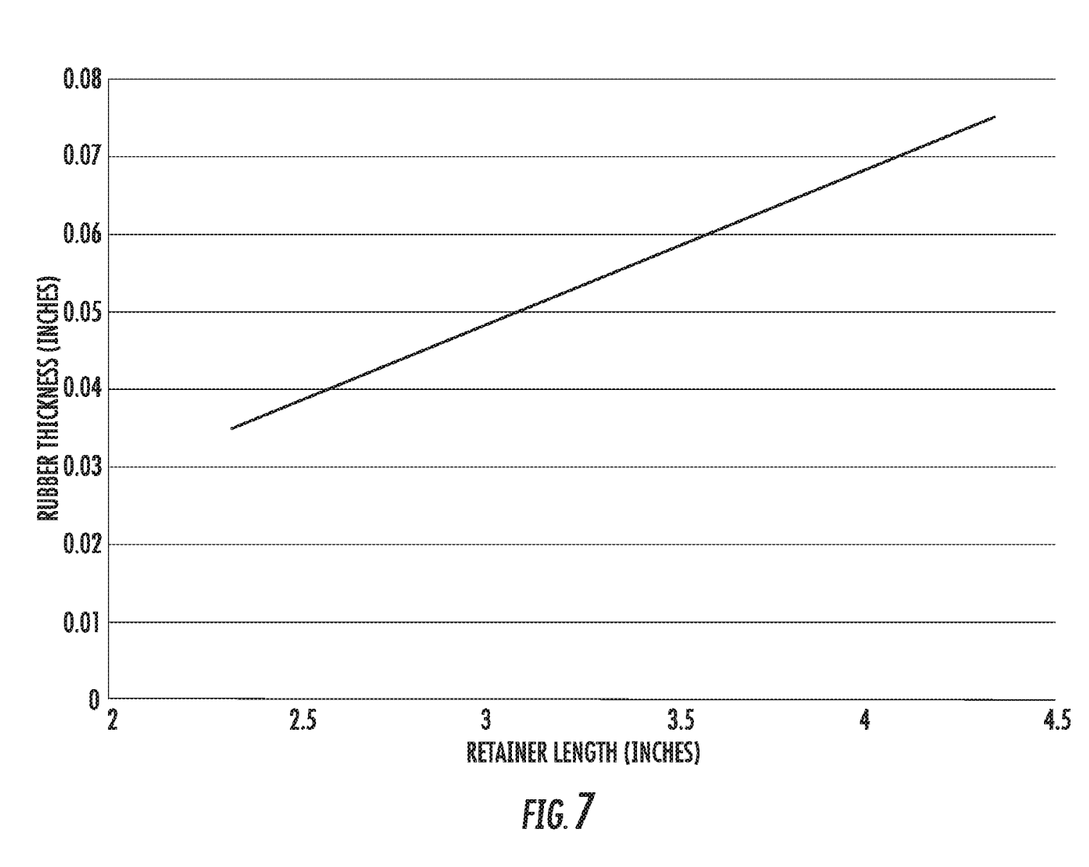
FIG. 7 is a graph depicting a relationship between elastomeric pad thickness and snubber retainer length, in accordance with an aspect of an exemplary embodiment.

In accordance with an aspect of an exemplary embodiment, elastomeric pad 134 includes a thickness that may vary depending on an overall length of retainer plate 104. As shown in FIG. 7, a linear relationship may exist between the thickness of elastomeric pad 134 and a length of retainer plate 104. For example, a retainer plate 104 having a length of about 2.33-inches (5.92-cm) may have an elastomeric pad 134 thickness of about 0.035-inches (0.889-mm). A retainer plate 104 having a length of about 3.335-inches (8.47-cm) may have an elastomeric pad 134 thickness of about 0.055-inches (1.397-mm). A retainer plate 104 having a length of about 4.34-inches (11.02-cm) may have an elastomeric pad 134 thickness of about 0.075-inches (1.905-mm). Of course, it should be understood that the length and thicknesses discussed above are merely exemplary.

At this point, it should be understood that the exemplary embodiments describe a snubber retainer that is mounted to a flexbeam of a rotor blade assembly. The snubber retainer includes a mounting arm portion that extends to a thicker portion of the flexbeam to provide a more robust attachment. That is, conventional snubbers are typically mounted to a thinner region of the flexbeam. Extending the attachment to a thicker region of the flexbeam, and securing the snubber with a retainer mechanical fastener provides an attachment mechanism that is both robust and also avoids debond failures associated with prior art systems. Further, the present invention also provides a snubber attachment that is not only mechanically linked to the flexbeam but also isolated from strain. Additionally, the snubber retainer described above may be readily visually inspected for failures, avoiding an inspection cycle requiring special tools to view the attachment.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flexbeam rotor blade assembly comprising:
   a flexbeam including a body having a first surface, a second, opposing surface and an opening extending through the first and second surfaces;
   at least one snubber assembly mounted to one of the first and second surfaces spaced along the body from the opening;
   a snubber retainer mounted to one of the first and second surfaces between the body and the at least one snubber, the snubber retainer including a retainer plate including a snubber attachment member to which the at least one snubber assembly is mounted and a mounting arm continuous and extending from the snubber attachment member, the mounting arm including a retainer plate opening spaced from the snubber attachment member, the retainer plate opening registering with the opening in the flexbeam, the retainer plate further including a first portion and a second portion continuous with the first portion and extending from the snubber attachment member to the retainer plate opening, wherein the first portion is in contact with one of the first or second surfaces, and the second portion is strain insulated from the flexbeam by a pad connecting the second portion and one of the first or second surfaces; and
   a mechanical fastener extending through the retainer plate opening and the opening in the flexbeam, the mechanical fastener joining the snubber retainer to the one of the first and second surfaces.

2. The flexbeam rotor blade assembly according to claim 1, wherein the retainer plate includes a first thickness at the snubber attachment member and a second thickness at the mounting arm, the second thickness being greater than the first thickness.

3. The flexbeam rotor blade assembly according to claim 2, wherein the second thickness defines a step region including a first end, a second end and an intermediate portion, the retainer plate opening being arranged at the intermediate portion.

4. The flexbeam rotor blade assembly according to claim 2, wherein the second thickness defines a taper extending from the first end to the second end.

5. The flexbeam rotor blade assembly according to claim 4, wherein the taper corresponds to a tapered profile of the one of the first and second surfaces of the flexbeam.

6. The flexbeam rotor blade assembly according to claim 3, wherein the second end defines, at least in part, an outer edge of the snubber retainer.

7. The flexbeam rotor blade assembly according to claim 3, wherein the pad is arranged between the snubber retainer and the one of the first and second surfaces.

8. The flexbeam rotor blade assembly according to claim 7, wherein the pad extends from the snubber attachment member up to the step region.

9. The flexbeam rotor blade assembly according to claim 3, wherein the mounting arm directly contacts the one of the first and second surfaces.

10. The flexbeam rotor blade assembly according to claim 1, wherein a width of the retainer plate at the mounting arm is less than a width of the retainer plate at the snubber attachment member.

11. A rotary wing aircraft comprising:

an airframe having an extending tail;

a main rotor assembly mounted to the airframe and configured to rotate about a main rotor axis; and a tail rotor system mounted at the extending tail, the tail rotor system being configured to rotate about a tail rotor axis, at least one of the main rotor assembly and the tail rotor system includes a flexbeam rotor assembly;

the flexbeam rotor blade assembly comprising:

a flexbeam including a body having a first surface, a second, opposing surface and an opening extending through the first and second surfaces;

at least one snubber mounted to one of the first and second surfaces spaced along the body from the opening;

a snubber retainer mounted to one of the first and second surfaces between the body and the at least one snubber, the snubber retainer including a retainer plate including a snubber attachment member and a mounting arm continuous and extending from the snubber attachment member, the mounting arm including a retainer plate opening spaced from the snubber attachment member, the retainer plate opening registering with the opening in the flexbeam, the retainer plate further including a first portion and a second portion continuous with the first portion and extending from the snubber attachment member to the retainer plate opening, wherein the first portion is in contact with one of the first or second surfaces, and the second portion is strain insulated from the flexbeam by a pad connecting between the second portion and one of the first or second surfaces; and a mechanical fastener extending through the retainer plate opening and the opening in the flexbeam, the mechanical fastener joining the snubber retainer to the one of the first and second surfaces.

12. The rotary wing aircraft of claim 11, wherein the pad is an elastomeric pad.

13. The rotary wing aircraft of claim 12, wherein a thickness of the elastomeric pad and a length of the retainer plate have a predetermined relationship.

14. The rotary wing aircraft of claim 11, wherein the retainer plate includes a first thickness at the snubber attachment member and a second thickness at the mounting arm, the second thickness being greater than the first thickness.

\* \* \* \* \*